(12) United States Patent
Dunn et al.

(10) Patent No.: US 8,006,039 B2
(45) Date of Patent: Aug. 23, 2011

(54) METHOD, SYSTEM, AND COMPUTER PROGRAM PRODUCT FOR MERGING DATA

(75) Inventors: Deanna P. Dunn, Hyde Park, NY (US); Robert J. Sonnelitter, III, Wappingers Falls, NY (US); Gary E. Strait, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 12/036,322

(22) Filed: Feb. 25, 2008

(65) Prior Publication Data

US 2009/0216915 A1    Aug. 27, 2009

(51) Int. Cl.
*G06F 13/00* (2006.01)

(52) U.S. Cl. ......... 711/130; 711/E12.017; 711/E12.038; 710/22

(58) Field of Classification Search .................. None
See application file for complete search history.

(56) References Cited

U.S. PATENT DOCUMENTS

| | | | |
|---|---|---|---|
| 5,623,628 A * | 4/1997 | Brayton et al. | 711/141 |
| 6,161,208 A * | 12/2000 | Dutton et al. | 714/764 |
| 6,247,099 B1 * | 6/2001 | Skazinski et al. | 711/141 |
| 2001/0011330 A1 | 8/2001 | Hughes et al. | |
| 2002/0108019 A1 | 8/2002 | Allen et al. | |
| 2005/0063421 A1 | 3/2005 | Wan et al. | |
| 2005/0216610 A1 | 9/2005 | Johns et al. | |
| 2006/0085569 A1 | 4/2006 | Buckland et al. | |
| 2006/0190636 A1 | 8/2006 | Daly, Jr. et al. | |

OTHER PUBLICATIONS

International Business Machines Corporation (IBM), z/Architecture Principles of Operations, Sixth Edition (Apr. 2007), 1216 (split into 4 parts).

* cited by examiner

*Primary Examiner* — Hetul Patel
(74) *Attorney, Agent, or Firm* — Cantor Colburn LLP; John Campbell (57) ABSTRACT

A method for merging data including receiving a request from an input/output device to merge a data, wherein a merge of the data includes a manipulation of the data, determining if the data exists in a local cache memory that is in local communication with the input/output device, fetching the data to the local cache memory from a remote cache memory or a main memory if the data does not exist in the local cache memory, merging the data according to the request to obtain a merged data, and storing the merged data in the local cache, wherein the merging of the data is performed without using a memory controller within a control flow or a data flow of the merging of the data. A corresponding system and computer program product.

12 Claims, 5 Drawing Sheets

METHOD, SYSTEM, AND COMPUTER PROGRAM PRODUCT FOR MERGING DATA

BACKGROUND OF THE INVENTION

This invention relates generally to computer processor operation, and more particularly to providing a method, system, and computer program product for merging data.

Modern computer systems may include multiple (e.g., two or more) processors and corresponding multiple level cache memories (or "caches") that store recently accessed data so that it can be quickly accessed again by a processor without the time delay (or "latency") resulting from having to access the main memory (or "memory") for the data. A multi-level cache may include a low level (or "L1") cache and higher level (e.g., "L2", "L3", etc.) caches, where the lower the level of the cache, the more quickly accessible it is by a processor. In such computer systems, manipulating (e.g., accessing and/or modifying) of input/output ("I/O") data in various increments, such as smaller than a standard memory block size, (or "merging") involves using (e.g., accessing and/or utilizing) a memory controller. Merging of I/O data is done by the memory controller by either: a) accessing data from the memory (when a copy of the data does not exist in the multi-level cache), merging the data, and then writing the data back to the memory; or b) removing (or "evicting") a copy of data from the cache to the memory controller, merging the data, then writing the data to the memory. These approaches for merging data are typically desirable for computer systems that include I/O devices that have direct access to a system connection (or "bus") and can be relatively easily routed to the memory controller.

However, the above described approaches are less desirable for multi-processor computer systems that include a shared level cache, such as the L2 cache, through which I/O components are directly and/or continuously attached. For example, application of these approaches for such shared cache configurations involves relatively long processing times to complete the I/O data manipulation for merging, which may include complex manipulation. Also, using the memory controller in these approaches causes an increased utilization of memory resources and the undesirable eviction of memory blocks that contain data (such control or instruction blocks) that needs to be commonly updated by I/O devices and the multi-processors. Therefore, a high performance approach to merging of data from I/O devices without incurring the additional latency resulting from using a memory controller is desirable.

BRIEF SUMMARY OF THE INVENTION

A method system, and computer program product for merging data is provided. An exemplary method embodiment includes receiving a request from an input/output device to merge a data, wherein a merge of the data includes a manipulation of the data, determining if the data exists in a local cache memory that is in local communication with the input/output device, fetching the data to the local cache memory from a remote cache memory or a main memory if the data does not exist in the local cache memory, merging the data according to the request to obtain a merged data, and storing the merged data in the local cache, wherein the merging of the data is performed without using a memory controller within a control flow or a data flow of the merge of the data.

An exemplary system embodiment includes an input/output device configured to send a request to merge a data, wherein a merge of the data includes a manipulation of the data, and a shared cache subsystem in local communication with the input/output device and configured to receive and respond to the request to merge the data from the input/output device, wherein the shared cache subsystem includes an input/output data buffer in local communication with the input/output device and configured to store the data during an operation to merge the data, a local cache memory in communication with the input/output data buffer and configured to store the data before and after the operation to merge the data, a data manipulation station in communication with the input/output data buffer and the local cache memory and configured to merge the data, and a cache memory control in communication with the data manipulation station and the input/output device and configured to control access of the data to the local cache memory, a remote cache memory, and a main memory before and after the operation to merge the data, wherein the shared cache subsystem is configured to merge the data without including a memory controller within a control flow or a data flow of the shared cache subsystem to merge the data.

An exemplary computer program product embodiment includes a computer usable medium having a computer readable program, wherein the computer readable program, when executed on a computer, causes the computer to receive a request from an input/output device to merge a data, wherein a merge of the data includes a manipulation of the data, determine if the data exists in a local cache memory that is in local communication with the input/output device, fetch the data to the local cache memory from a remote cache memory or a main memory if the data does not exist in the local cache memory, merge the data according to the request to obtain a merged data, and store the merged data in the local cache, wherein the data is merged without using a memory controller within a control flow or a data flow of the merge of the data.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments of the invention described herein provide a method, system, and computer program product for merging data. In accordance with such exemplary embodiments, a high performance approach is obtained for merging data from I/O devices without incurring the additional latency resulting from using (e.g., accessing and/or utilizing) a memory controller within the control flow or data flow of the merge operation.

Figure 1:
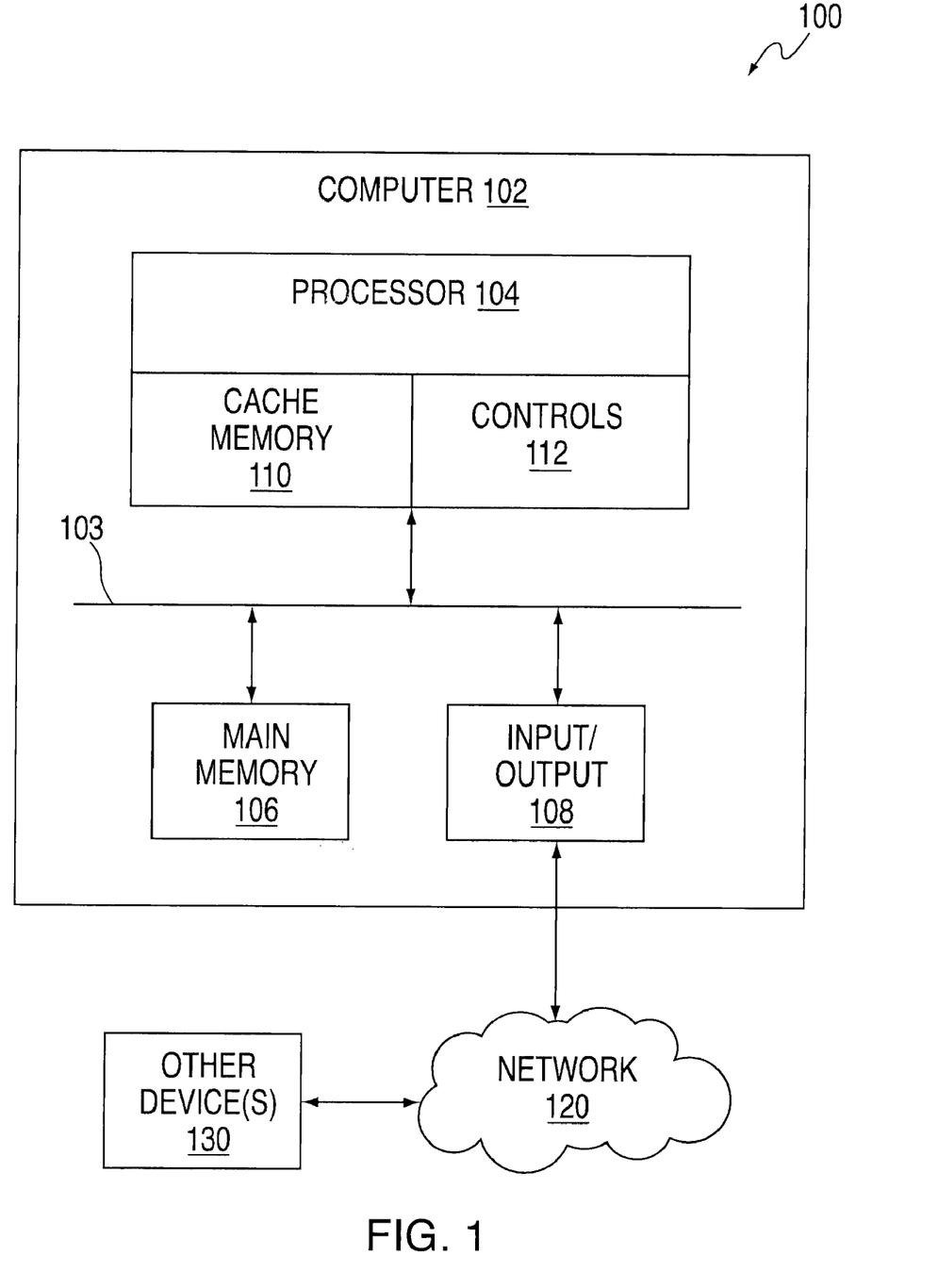
FIG. 1 is a block diagram illustrating an example of a computer system including an exemplary computing device configured for merging data.

Turning now to the drawings in greater detail, wherein like reference numerals indicate like elements, FIG. 1 illustrates an example of a computer system 100 including an exemplary computing device ("computer") 102 configured for merging data. In addition to computer 102, exemplary computer system 100 includes network 120 and other device(s) 130. Network 120 connects computer 102 and other device(s) 130 and may include one or more wide area networks (WANs) and/or local area networks (LANs) such as the Internet, intranet(s), and/or wireless communication network(s). Other device(s) 130 may include one or more other devices, e.g., one or more other computers, storage devices, peripheral devices, etc. Computer 102 and other device(s) 130 are in communication via network 120, e.g., to communicate data between them.

Exemplary computer 102 includes processor 104, main memory ("memory") 106, and input/output component(s) 108, which are in communication via bus 103. Processor 104 may include multiple (e.g., two or more) processors and includes cache memory ("cache") 110 and controls 112, which include components configured for merging data that will be described below. Cache 110 may include multiple cache levels (e.g., L1, L2, etc.) that are on or off-chip from processor 104 (e.g., an L1 cache may be on-chip, an L2 cache may be off-chip, etc.). Memory 106 may include various data stored therein, e.g., instructions, software, routines, etc., which, e.g., may be transferred to/from cache I/O by controls 112 for execution by processor 104. Input/output component(s) 108 may include one or more components, devices, etc. that facilitate local and/or remote input/output operations to/from computer 102, such as a display, keyboard, modem, network adapter, ports, etc. (not depicted).

Figure 2:
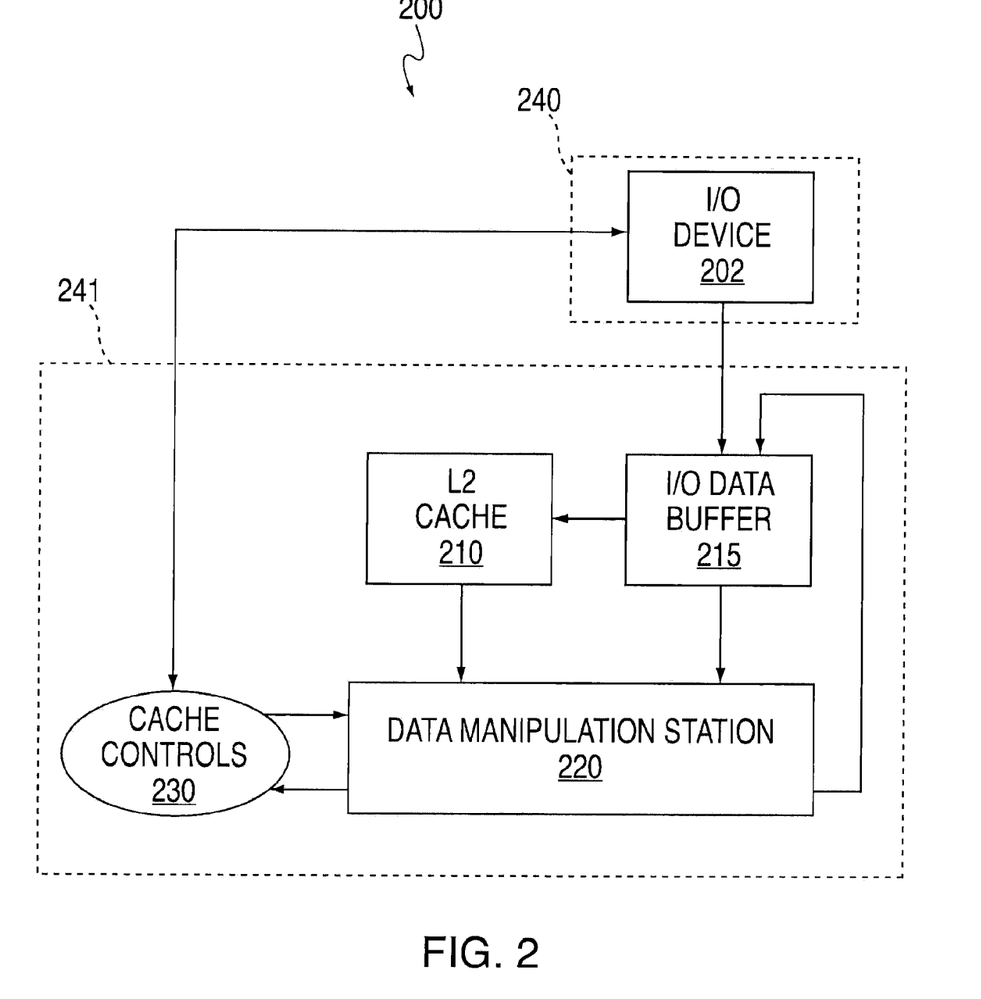
FIG. 2 is a block diagram illustrating an example of a processor subsystem of the exemplary computing device of FIG. 1 that is configured for merging data.

FIG. 2 illustrates an example of a processor subsystem 200 of exemplary computer 102 that is configured for merging data. Exemplary subsystem 200 may, e.g., be part of controls 112 and cache 110. Subsystem 200 includes one or more input/output devices ("I/O device") 202, which, e.g., may be part of I/O components 108 and configured, e.g., to facilitate local and/or remote data input/output operations to/from computer 102. I/O device 202 is in communication with one or more I/O data buffers ("I/O data buffer") 215, which are configured, e.g., to store data (e.g., temporarily) during merge operations (or "requests") and may also be further configured to interleave data (e.g., to/from L2 cache 210). I/O data buffer 215 is in communication with L2 cache 210, which is configured, e.g., to store data before and after merge operations, and data manipulation station ("DMS") 220, which is configured, e.g., to perform merge operations (e.g., accessing and/or modifying data, as further discussed below). L2 cache 210 is also in communication with DMS 220. DMS 220 is also in communication with one or more cache memory controls ("cache control") 230, which are configured, e.g., to control access of data (e.g., fetches, loads, etc.) to/from L2 cache 210, cache memory 110, and main memory 106, e.g., before or after merge operations. Cache control 230 is also in communication with I/O device 200. In an exemplary embodiment, I/O device 202 is in local communication (e.g., directly and/or continuously attached or connected between devices, chips, interfaces, etc.) to a shared cache subsystem 241 that includes L2 cache 210, I/O data buffer 215, DMS 220, and cache control 230. Furthermore, in an exemplary embodiment, there is one DMS 220 for each L2 cache 210 and one corresponding I/O data buffer 215 in shared cache subsystem 241.

In an exemplary operation of subsystem 200, an I/O data merge command (e.g., for a merge operation), along with, e.g., accompanying data, is sent from I/O device 202 to shared cache subsystem 241 via I/O data buffer 215. An exemplary merge operation includes manipulating (e.g., complex manipulating) of I/O data, e.g., in various increments, such as smaller than a standard memory block size. For example, such manipulation in a merge operation may include accessing and modifying a subset of data contained within a line or double line sized memory block that is alongside (e.g., physically adjacent and/or in local communication with) the shared data cache. In that regard, I/O device 202 may be included on one chip 240 that is in local communication with shared cache subsystem 241 that is included on another chip 241. If the I/O data merge command is a store-type command, new data is written from I/O device 202 temporarily into an I/O data buffer 215. Cache control 230 then determines whether the target data is hit in L2 cache 210.

If the target data is hit in L2 cache 210, the memory block (cache line, etc.) is read out of L2 cache 210 and sent to DMS 220, e.g., one quad word at a time. The corresponding quad word of new data is, read out of I/O data buffer 215, e.g., at the same time, and sent to DMS 220. Based on the type of data manipulation (e.g., access and/or modification) needed in response to the merge command, DMS 220 either updates each byte of the quad word (e.g., by setting it to a logic-1 value, resetting it to a logic-0 value, or overwriting the byte with a corresponding byte of the new I/O data), accesses a particular byte, and/or leaves the byte unchanged. Each quad word is then written back to the I/O data buffer 215. Cache control 230 then triggers the updated data to be written back to L2 cache 210; thereby leaving the memory block available for use by local processors 104 and other I/O devices 108.

The merge operation is performed in L2 cache 210 on the same chip that I/O device 202 is in communication with. If the target data is missed in L2 cache 210, the memory block is first fetched into L2 cache 210 (e.g., either from a remote cache 110 or memory 106). Once the memory block has been moved into the L2 cache 210, the merge is performed in the same manner as the local hit case described above. After the merge, the data is written back to L2 cache 210. In some embodiments, the data may also be written back into the remote cache 110 or memory 106 that it was fetched from.

Figure 3:
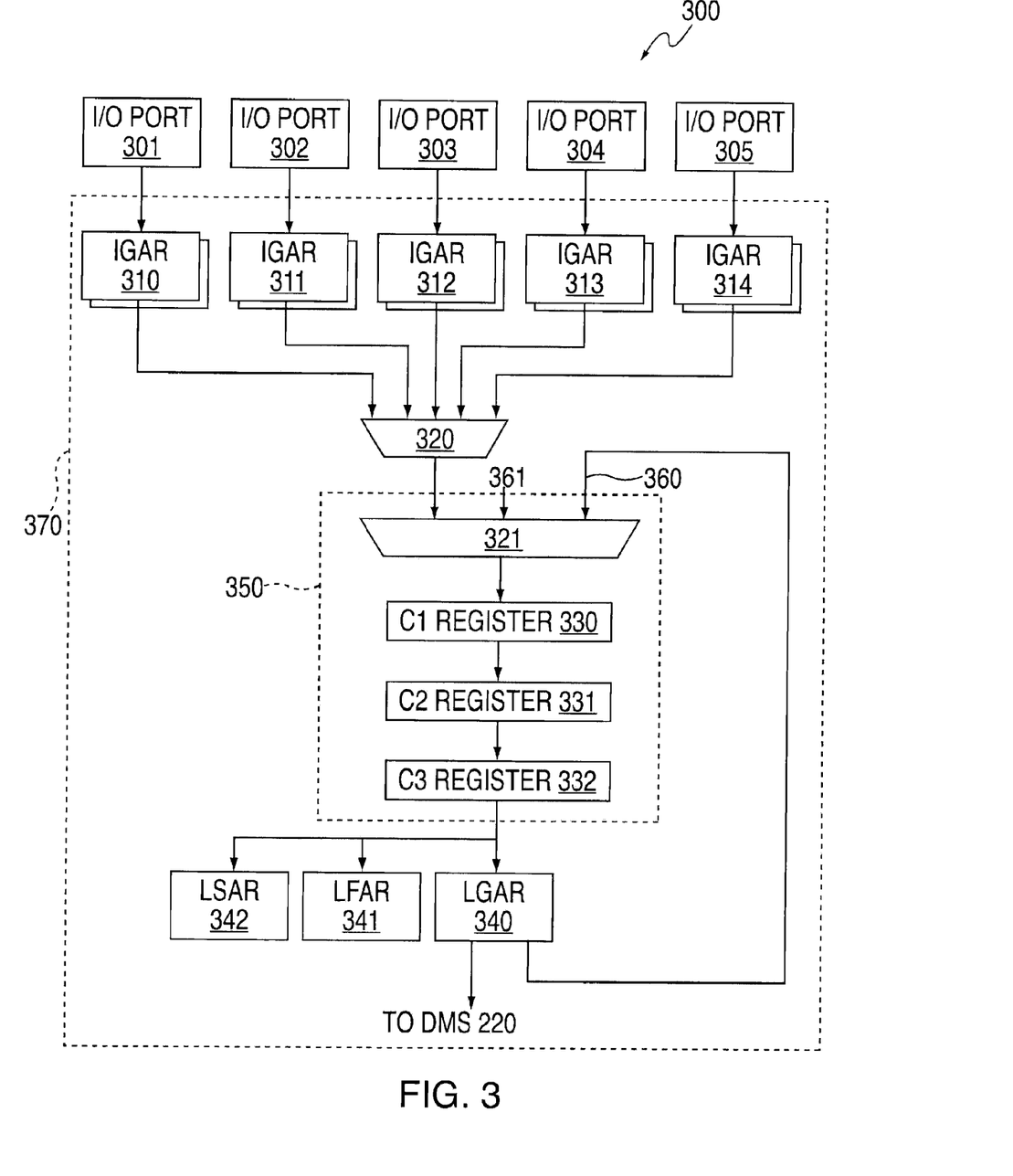
FIG. 3 is a block diagram illustrating an example of a high level control flow of the shared cache subsystem of the exemplary processor subsystem of FIG. 2.

FIG. 3 illustrates an example of a high level control flow 300 of shared cache subsystem 241 that is related to the I/O data manipulation sequence and presents an exemplary utilization of L2 cache pipeline 210 to facilitate the access and usage of I/O data buffer 215 and DMS 220. Exemplary control flow 300 includes I/O ports 301, 302, 303, 304, 305 (e.g., in communication with or part of one or more I/O devices 202) that drive I/O data merge requests (or "operations") to shared L2 cache circuitry 370 via I/O group ("GX") address register controllers ("IGARs") 310, 311, 312, 313, 314, which can group and store request instructions. IGARs 310, 311, 312, 313, 314 (which, e.g., are in pairs) are in communication with an L2 cache control main system pipeline ("pipeline circuitry" or "pipeline.") 350 via multiplexer 320.

Pipeline 350 includes multiplexer 321 in communication sequentially with C1 register 330, C2 register 331, and C3 register 332. L2 pipeline 180 outputs to local GX address register controller ("LGAR") 340, local fetch address register controller ("LFAR") 341, and local store address register controller ("LSAR") 342. LGAR 340 is also in communication with multiplexer 321 via input 360, and other requests may be received to multiplexer 321 via input 361. LGAR 340 is configured to control the sequencing of the merge operation, protect the memory block from being accessed by other I/O devices or the processors (e.g., processor 104) while the merge is taking place, and prevent multiple operations from trying to use DMS 220 at the same time. This latter function is accomplished, e.g., since LGAR 340 is the controller that interacts with DMS 220. There is one instance of LGAR 340 corresponding to one DMS 220 and one I/O data buffer 215. As a result, data manipulation is performed alongside the local cache, i.e. the cache that the requesting I/O device 202 is attached to, regardless of whether the memory block is hit in L2 cache 210.

In an exemplary operation of control flow 300, all ten IGARs 310, 311, 312, 313, 314 may need the use of DMS 220. Pipeline 350 is utilized to serialize access to DMS 220. IGARs 310, 311, 312, 313, 314 compete for priority and are multiplexed by multiplexer 320 into a single request line for pipeline 350. Central pipeline priority then arbitrates between the IGAR request line (i.e., via multiplexer 320) and request lines 360, 361 from other pipe requests and multiplexes one request into pipeline 350 each cycle via multiplexer 321. If a request from IGAR 310, 311, 312, 313, or 314 wins the arbitration, it flows through the three pipeline cycles (i.e., via registers 330, 331, 332). During the first pipeline cycle 330, a lookup in the local L2 cache directory is performed and the hit results are available in the second pipeline cycle 331. If the merge operation hits in the local L2 cache 210, in the third pipeline cycle 332, LGAR 340 is loaded with the command if LGAR 340 is available.

If LGAR 340 is not available, the one or more requests from IGARs 310, 311, 312, 313, and/or 314 are held until LGAR 340 becomes available and then re-enters with priority among the other IGAR requests via multiplexer 320 and re-enters pipeline 350 with priority via multiplexer 321. The request that has been loaded into LGAR 340 has exclusive access to DMS 220. No request can access the DMS 220 without first being loaded to LGAR 340. LGAR 340 then sends the needed requests to pipeline 350 via request input 360, and sends the appropriate controls to DMS 220 needed to sequence the cache read, data manipulation, I/O response, and cache write steps needed to complete the command (which will be described further below).

If the merge operation does not hit in the local L2 cache 210, in the third pipeline cycle 332, LGAR 340 is not loaded with the command. Instead, LFAR 341 is loaded, if LFAR 341 is available, and fetches the memory block into the local L2 cache 210. If LFAR 341 is not available, the one or more requests from IGARs 310, 311, 312, 313, and/or 314 are held until LFAR 341 becomes available and then re-enters with priority among the other IGAR requests via multiplexer 320 and re-enters pipeline 350 with priority via multiplexer 321. Once loaded, LFAR 341 fetches the memory block into the L2 cache 210 from its source location (e.g., either from a remote cache 110 or memory 106) and then makes a subsequent central pipeline request to load LGAR 340. LGAR 340 then makes the requests to pipeline 350 needed to sequence the cache read, data manipulation, I/O response, and cache write steps needed to complete the command. If needed, LGAR 340 then makes a final pipe pass to load LSAR 342. LSAR 342 then returns the updated data to its source location (e.g., L2 cache 210, memory 106, etc.). Orthogonality is maintained on the select lines of multiplexer 321 since LGAR 340 uses pipeline 350 to sequence the data manipulation sequence and LGAR 340 needs to be loaded before the an IGAR 310, 311, 312, 313, 314 is allowed to send data to shared cache subsystem 241.

Figure 4:
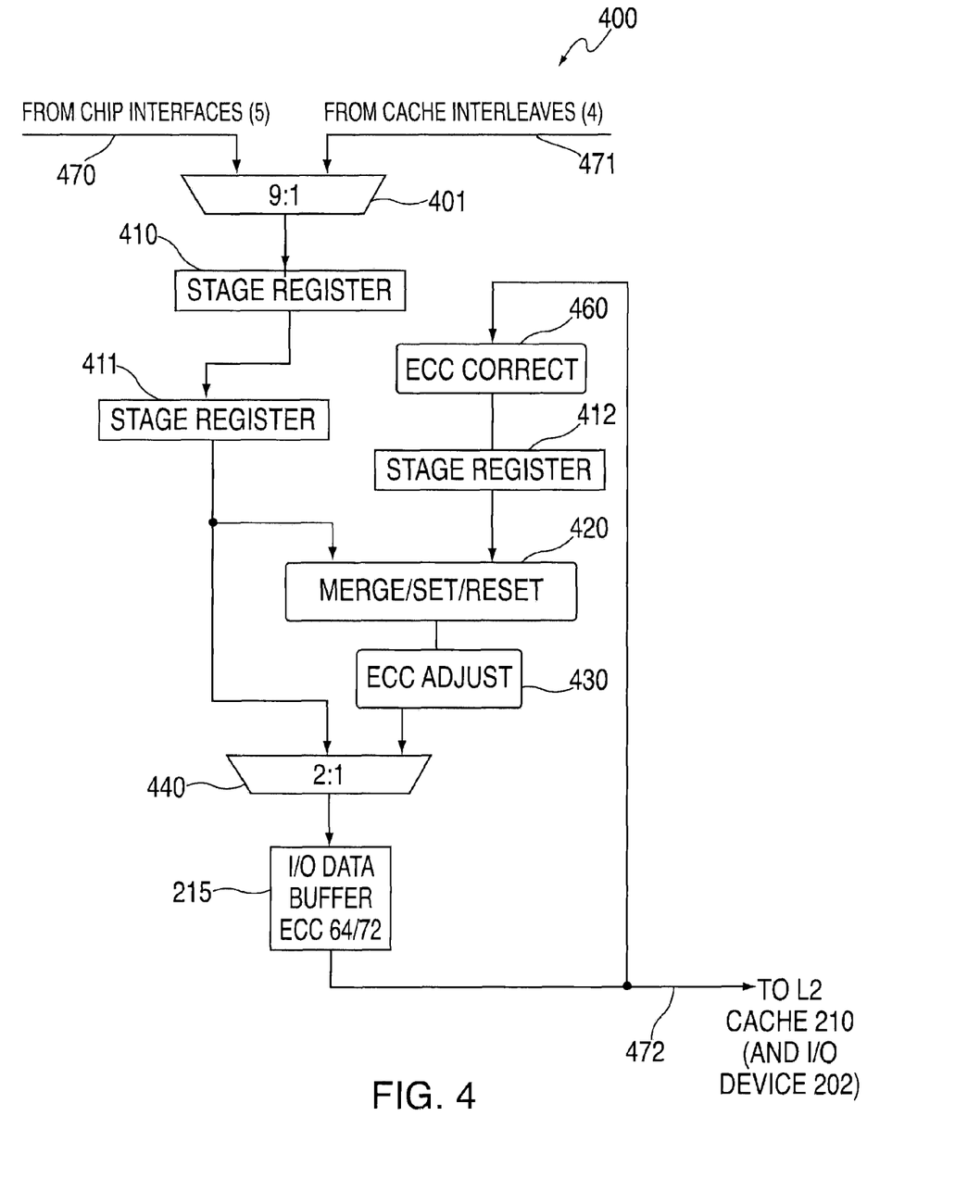
FIG. 4 is a block diagram illustrating an example of a high level data flow of the shared cache subsystem of the exemplary processor subsystem of FIG. 2.

FIG. 4 illustrates an example of a high level data flow 400 of DMS 220 that is related to the I/O data manipulation sequence and represents how the L2 cache arrays and associated data flow components and connections facilitate these sequences. Exemplary data flow 400 includes multiplexer 401, which may, e.g., be a nine-to-one multiplexer and is in communication with inputs from chip interfaces 470 (e.g. via I/O devices 204) and L2 cache interleaves 471 (e.g., via L2 cache 210). Multiplexer 401 is in communication via an output with stage register 410, which is in communication with stage register 411. Stage register 411 is in communication with merge station 420 and multiplexer 440, which may, e.g., be a two-to-one multiplexer. Merge station 420 is also in communication with stage register 412 which is in communication with error correcting code ("ECC") correction module 460. Merge station 420 is further in communication with ECC adjustment module 430, which is also in communication with multiplexer 440. Multiplexer 440 is further in communication with I/O data buffer 215, which is also in communication with ECC correction module 460 as well as L2 cache 210 and I/O device 202.

In an exemplary operation of data flow 400, data enters the exemplary flow 400 either from one of the five chip interfaces 470 or from the L2 cache 210 via input 471. Cache 210 is interleaved such that it drives four fetch buses. Thus, the implementation of nine-to-one multiplexer 401 at the input to data flow 400. When data first arrives from one of the I/O ports 470, it is routed through multiplexer 401, which is staged for two cycles via stage registers 410, 411, and then written I/O data buffer 215 via multiplexer 440. Because I/O data buffer 215 is reused to write the updated data (resulting, e.g., in area, wiring, and power savings), two-to-one multiplexer 440 inputs to I/O data buffer 215 to select between in-gating data from I/O ports 470 and from the output of merge station 420.

During the pipe cycle when the merge operation takes place, the new data from the I/O data buffer 215 and the old data from the cache interleaves 471 is fed, e.g., one quad word at a time, to merge station 420. The dataflow is protected by error correcting code (ECC), so the new data from the interface is checked and, if needed, corrected via ECC correction module 460 before it reaches merge station 420. The new data then passes through stage register 412 to line the quad word up with the corresponding quad word arriving from L2 cache 210. Based on the particular command being processed, merge station 420 forms the appropriate mask to update or not update each byte in the quad word (e.g., by setting it to a logic-1 value, resetting it to a logic-0 value, or overwriting the byte with a corresponding byte of the new I/O data). The ECC protection bits are then adjusted via ECC adjustment module 430 to account for changes made to the newly merged data. The newly merged quad word is then fed via multiplexer 440 to I/O data buffer 215 and written back to the first position of I/O data buffer 215. This sequence is repeated for the remaining quad words, until the entire memory block has been updated. Once the data manipulation has been completed for all the quad words in the memory block, the updated data can be then written back to L2 cache 210 and, optionally, to I/O device 202 from the I/O data buffer 215.

Figure 5:
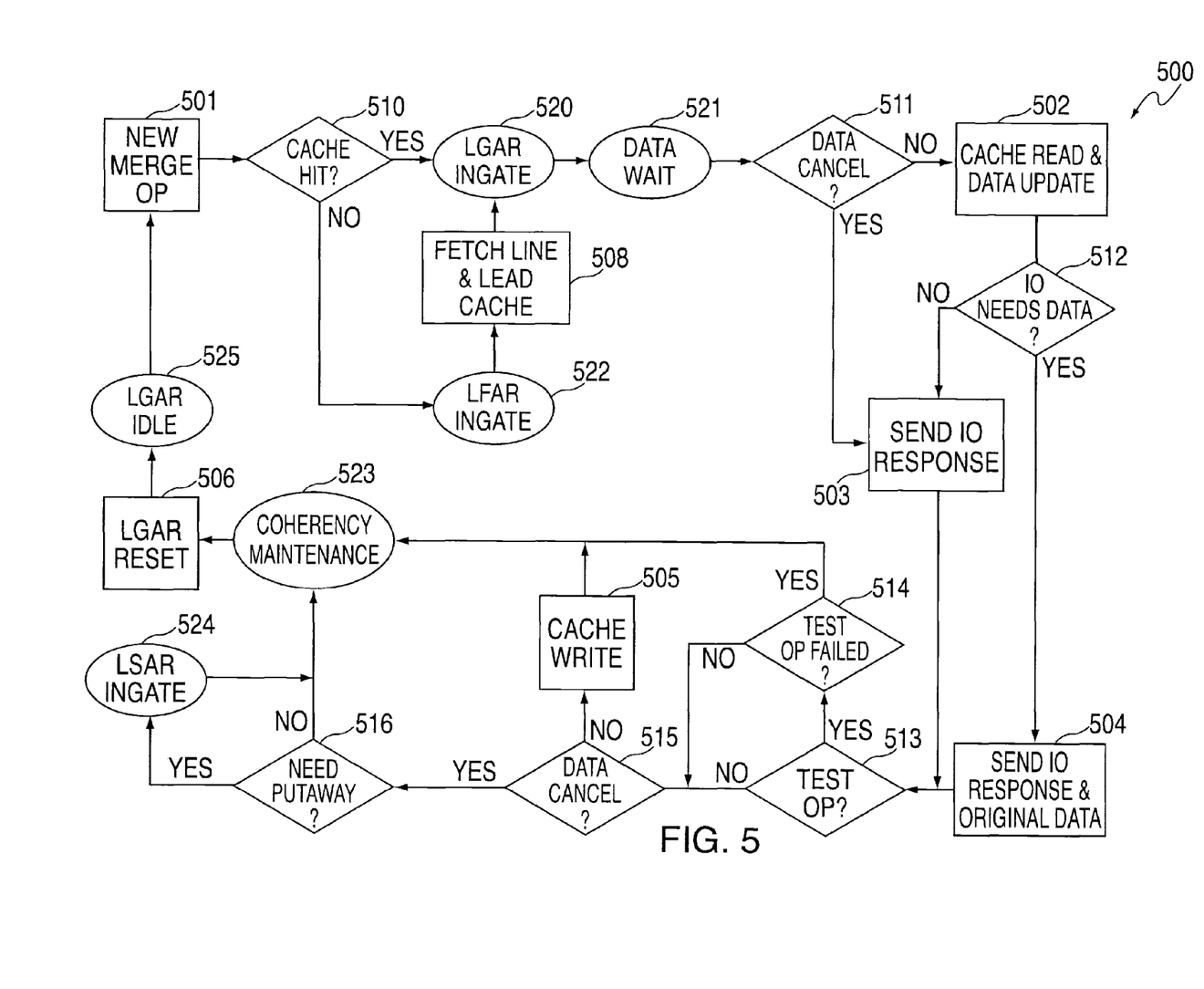
FIG. 5 is a flow diagram illustrating an example of a method for merging data executable, for example, on the exemplary computing device of FIG. 1.

FIG. 5 illustrates an example of a method 500 for merging data executable, for example, on exemplary computer 102. In block 501, a request for a merge operation (e.g., instructions and corresponding data) to a system cache controller (e.g., cache control 230) is received from an I/O device (e.g., I/O device 102) in, e.g., local communication with the cache controller. In some embodiments, data corresponding to the request is not sent at the time of the merge request (e.g., just the request instructions are sent). When a merge operation is presented to the system cache controller, a pipeline (or "pipe.") pass (e.g., via pipeline 350) is made to determine if the target memory block of the merge operation is hit or missed in the local cache (e.g., L2 cache 210) per block 510. If the merge operation is a cache hit, a remote cache fetch or memory access (e.g., to a higher level of cache 110 or to memory 106) is not needed, so the merge operation is loaded into a local group ("GX") address register controller ("LGAR", e.g., LGAR 340).

If the merge operation is a cache miss, the merge operation is loaded into a local fetch address register controller ("LFAR", e.g., LFAR 341) per block 522. The LFAR performs a remote cache fetch or memory access to retrieve the memory block and then load the memory block into the local cache during the merge operation per block 508. Once the cache has been loaded with the target memory block in block 508, then the LGAR is loaded per block 520. As discussed above, the LGAR controls the data manipulation, which is performed alongside the local cache (i.e. the cache that the requesting I/O device is attached to).

Once the LGAR has been loaded per block 520, the I/O interface controller (e.g., of I/O device 202) is notified that the request has won access (e.g., through arbitration with competing requests from other I/O devices) to the data manipulation station (e.g., DMS 220) and that the shared cache subsystem is ready to receive the stored data from the I/O interface controller (i.e., in embodiments where the data is not sent with the merge request). In embodiments where the data is not sent with the merge request, the LGAR may idle in a data wait state (e.g., waiting for the data), per block 521, until the data is loaded to the local cache. If the data is not loaded (e.g., within a system dependent functionally feasible amount of time, which, e.g., may result if the data is in use for another operation), a data transfer cancellation instruction is sent to the local cache by the LGAR per block 511, thereby cancelling (or rejecting) the merge request. If the data transfer is not cancelled, the LGAR performs a cache read and data update pipe pass, per block 502, that starts a sequential (e.g., one quad word per cycle) cache read. The cache read data flows through the data flow merge logic (e.g., of data flow 400), and the resulting merged data is loaded to an I/O data buffer (e.g., I/O data buffer 215). This cache read and data update pipe pass utilizes the data manipulation station, and in some embodiments, is the sole pipe pass that utilizes the data manipulation station. If the data transfer is not cancelled per block 511, after the data has been written to the I/O data buffer, a response (e.g., the merged data in response to the merge request) is sent to the I/O device per block 503.

Some merge operations are dependent on the original data being returned to the I/O device to fulfill the request. If the sequence is such an operation, as determined per block 512, the original cache data may be returned to the I/O device per block 504. This is performed, e.g., by reading the contents of the target memory block from the local cache entry it resides in during the pipe pass that triggers the I/O response data in block 504. This is feasible, e.g., since the sequence is structured such that the update data is still in the I/O data buffer at this point in method 500 and has not yet been written back into the target cache position.

Some merge operations are dependent on a designated byte of the target memory block (e.g., a lock byte) being a designated logic value (e.g., logic-0) before the merge operation is allowed to update the memory block to fulfill the request. If the sequence is such an operation, the pipe pass in block 502 may also trigger the performance of a lock byte test and a save of the test result to use later in the sequence to determine if a cache write (i.e., per block 505) should be performed. The lock byte test may be performed by the data manipulation station, and one or more results of the lock byte test may be stored by the data manipulation station for reference later in the sequence.

If the merge operation is dependent on a lock byte test, as determined in block 513, then the result of the lock byte test from the cache read and data update pipe pass in block 502 may be reviewed in block 514. For example, if the result of the lock byte test is the designated logic value, e.g., logic-0, the lock byte test is passed and, if the operation was not cancelled e.g., by the I/O interface controller, per the determination in block 515, the data is moved from the I/O data buffer into the local cache per block 505. Furthermore, if result of the lock byte is not logic-0 (e.g., logic-1), the lock byte test is failed, and the memory block is considered "locked", so a cache write is not performed. At this point, the data manipulation for the merge operation sequence is complete.

In some embodiments, the LGAR may perform additional pipe passes to perform cache coherency maintenance per block 523 to ensure the appropriate architectural structure of the cache after the merge operation. Furthermore, in some embodiments, if the data was moved into the cache from another memory block, the data may be left in the local cache or copied (e.g., to return or "put away" the data) back to the location the data was retrieved from (e.g., in the memory or a remote cache) per block 516. If the data needs to be put away, the LGAR makes another pipe pass to load a local store address register controller ("LSAR", e.g., LSAR 342), per block 524, and the LSAR returns or puts away the updated memory block to its source location. The LGAR may also be reset, per block 506, and idle, per block 525, until another merge operation is received from an I/O device.

Elements of exemplary computer system 100, exemplary processor subsystem 200, and exemplary flows 300, 400 are illustrated and described with respect to various components, modules, blocks, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to elements of exemplary computer system 100 and exemplary subsystem 200, execution of the flow diagram blocks may be implemented with respect to other systems, subsystems, etc. that provide the same features, functions, etc. in accordance with exemplary embodiments of the invention.

As described above, embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a generalpurpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for merging data, comprising:
an input/output device configured to send a request to merge a data, wherein a merge of the data comprises a manipulation of the data; and
a shared cache subsystem in local communication with the input/output device and configured to receive and respond to the request to merge the data from the input/output device, wherein the shared cache subsystem comprises:
an input/output data buffer in local communication with the input/output device and configured to store the data during an operation to merge the data;
a local cache memory in communication with the input/output data buffer and configured to store the data before and after the operation to merge the data;
a data manipulation station in communication with the input/output data buffer and the local cache memory and configured to merge the data; and
a cache memory control in communication with the data manipulation station and the input/output device and configured to control an access of the data to the local cache memory, a remote cache memory, and a main memory before and after the operation to merge the data;
wherein the shared cache subsystem is configured to merge the data without including a memory controller within a control flow or a data flow of the shared cache subsystem to merge the data, the control flow comprising:
a plurality of input/output ports in local communication with the input output device and a plurality of other input/output devices and configured to input the request and other requests to the shared cache subsystem;
a plurality of input/output group address register controllers in local communication with the input/output ports and configured to group and store request instructions;
a first multiplexer in communication with the plurality of input/output group address register controllers;
a pipeline circuitry in communication with the first multiplexer, wherein the pipeline circuitry comprises:
a second multiplexer in communication with the first multiplexer and other request inputs;
a first register in communication with the second multiplexer;
a second register in communication with the first register; and
a third register in communication with the second register;
a local group address register controller in communication with the data manipulation station and with the pipeline circuitry, via the third register and the second multiplexer, and configured to control receiving and responding to the request;
a local fetch address register controller in communication with the pipeline circuitry via the third register and configured to control fetching the data to the local cache memory from the remote cache memory or the main memory during the operation to merge the data; and
a local store address register controller in communication with the pipeline circuitry via the third register and configured to control returning a merged data to the remote memory or the main memory during the operation to merge the data.

2. The system of claim 1, wherein the shared cache subsystem is further configured to:
determine if the data exists in the local cache memory;
fetch the data to the local cache memory from the remote cache memory or the main memory if the data does not exist in the local cache memory;
merge the data according to the request to obtain a merged data; and
store the merged data in the local cache memory.

3. The system of claim 2, wherein the shared cache subsystem is further configured to:
wait to receive the data to the local cache memory responsive to determining that the data is not received with the request.

4. The system of claim 2, wherein the shared cache subsystem is further configured to:
send the data to the input/output device if fulfilling the request is dependent on returning the data to the input/output device; and
if fulfilling the request is dependent on a lock byte test of the data:
perform a lock byte test on the data that determines whether a designated lock byte of the data has a designated logic value;
merge the data if the designated lock byte has the designated logic value;
reject the request if the designated lock byte does not have the designated logic value.

5. The system of claim 2, wherein the shared cache subsystem is further configured to merge an additional data from the local cache memory to check the coherency of the local cache memory to ensure an appropriate architectural structure thereof.

6. The system of claim 2, wherein the shared cache subsystem is further configured to return the merged data to the remote memory or the main memory responsive to determining that the data was fetched therefrom.

7. A system for merging data, comprising:
an input/output device configured to send a request to merge a data, wherein a merge of the data comprises a manipulation of the data; and
a shared cache subsystem in local communication with the input/output device and configured to receive and respond to the request to merge the data from the input/output device, wherein the shared cache subsystem comprises:
an input/output data buffer in local communication with the input/output device and configured to store the data during an operation to merge the data;

a local cache memory in communication with the input/output data buffer and configured to store the data before and after the operation to merge the data;

a data manipulation station in communication with the input/output data buffer and the local cache memory and configured to merge the data; and a cache memory control in communication with the data manipulation station and the input/output device and configured to control an access of the data to the local cache memory, a remote cache memory, and a main memory before and after the operation to merge the data;

wherein the shared cache subsystem is configured to merge the data without including a memory controller within a control flow or a data flow of the shared cache subsystem to merge the data, the control flow comprising:

a first multiplexer in local communication with the input output device, a plurality of other input/output devices, and the local cache memory;

a first register in communication with the first multiplexer;

a second register in communication with the first register;

a merge station in communication with the second register and configured to update the data in accordance with the request to merge the data;

an error correcting code adjustment module in communication with the merge station and configured to adjust an error correcting code protection data corresponding to a merged data;

a second multiplexer in communication with the error correcting code adjustment module and the second register;

the input/output data buffer in communication with the second multiplexer;

an error correcting code correction module in communication with the input/output data buffer and configured to check and correct the data using the error correcting code protection data; and a third register in communication with the error correcting code correction module and the merge station.

8. The system of claim 7, wherein the shared cache subsystem is further configured to:

determine if the data exists in the local cache memory;

fetch the data to the local cache memory from the remote cache memory or the main memory if the data does not exist in the local cache memory;

merge the data according to the request to obtain a merged data; and store the merged data in the local cache memory.

9. The system of claim 8, wherein the shared cache subsystem is further configured to wait to receive the data to the local cache memory if the data is not received with the request.

10. The system of claim 8, wherein the shared cache subsystem is further configured to:

send the data to the input/output device if fulfilling the request is dependent on returning the data to the input/output device; and if fulfilling the request is dependent on a lock byte test of the data:

perform a lock byte test on the data that determines whether a designated lock byte of the data has a designated logic value;

merge the data if the designated lock byte has the designated logic value;

reject the request if the designated lock byte does not have the designated logic value.

11. The system of claim 8, wherein the shared cache subsystem is further configured to merge an additional data from the local cache memory to check the coherency of the local cache memory to ensure an appropriate architectural structure thereof.

12. The system of claim 8, wherein the shared cache subsystem is further configured to return the merged data to the remote memory or the main memory responsive to determining that the data was fetched therefrom.

\* \* \* \* \*